T. M. IRWIN.
SAFETY HOSE SUPPORTER.
APPLICATION FILED MAY 5, 1916.
1,224,466.
Patented May 1, 1917.
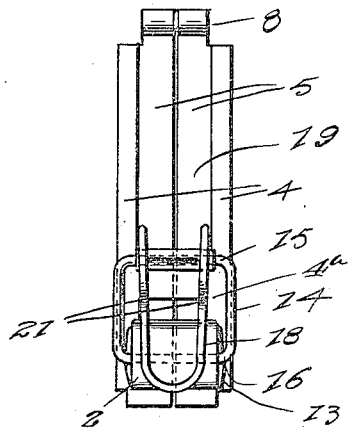
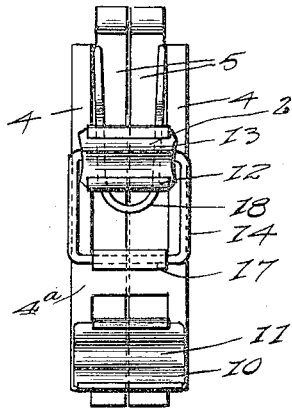
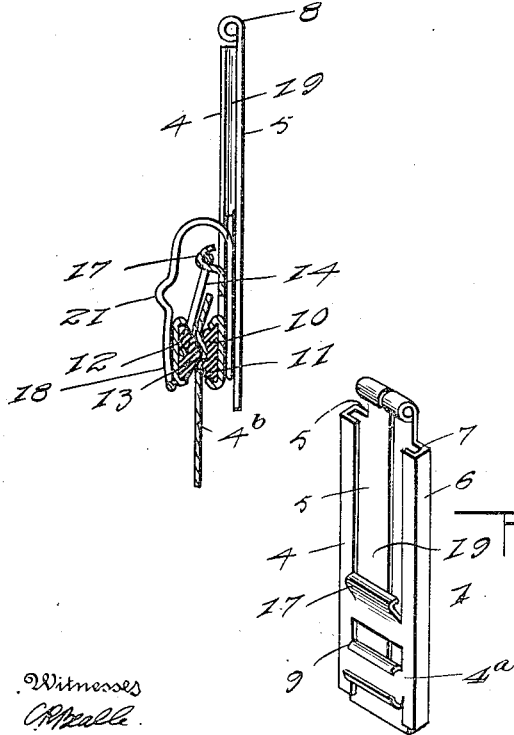
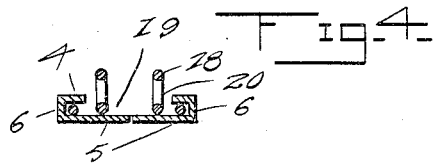
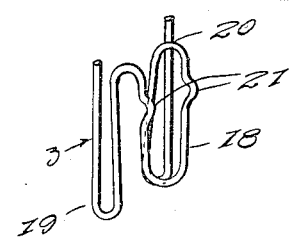
Inventor
T. M. Irwin.

UNITED STATES PATENT OFFICE.

TRUMAN MEAD IRWIN, OF WALLACEBURG, ONTARIO, CANADA.

SAFETY HOSE-SUPPORTER.

1,224,466.  Specification of Letters Patent.  Patented May 1, 1917.

Application filed May 5, 1916. Serial No. 95,597.

*To all whom it may concern:*

Be it known that I, TRUMAN M. IRWIN, a subject of the King of Great Britain, residing at Wallaceburg, in the Province of Ontario and Dominion of Canada, have invented certain new and useful Improvements in Safety Hose-Supporters; and I do hereby declare the following to be a full, clear, and exact description of the invention, such as will enable others skilled in the art to which it appertains to make and use the same.

The invention relates to improvements in hose supporters.

The object of the present invention is to improve the construction of garment supporters and to provide a simple, practical and comparatively inexpensive hose supporter designed particularly for use on hose and adapted to securely grip the same without liability of tearing, wearing or otherwise injuring the fabric.

A further object of the invention is to provide a hose supporter of this character in which it will be unnecessary to draw the material of the hose over the button and clamp the hose around the same and which will present only soft rubber surfaces to the hose so that the most delicate fabric may be held without injuring.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing

Figure 1 is a front elevation of a hose supporter constructed in accordance with this invention, the parts being in their engaging position, Fig. 2 is a similar view the device being open, Fig. 3 is a central longitudinal sectional view of the hose supporter, the parts being arranged as illustrated in Fig. 1 of the drawing, Fig. 4 is a transverse sectional view illustrating the manner of slidably connecting the resilient clamping slide with the relatively fixed member or body, Fig. 5 is a detail perspective view of the relatively fixed member or body, Fig. 6 is a detail perspective view of the resilient clamping slide.

In the accompanying drawing in which is illustrated the preferred embodiment of the invention, the safety hose supporter which is designed principally for supporting hose but which may be employed for analogous purposes comprises in its construction, a relatively fixed member or body 1, a movable member 2 and a resilient slide 3 mounted on the relatively fixed member and movable into and out of engagement with the relatively movable member for holding the latter and the relatively fixed member in engagement with the top portion 4$^b$ of the hose to be supported as clearly illustrated in Fig. 3 of the drawings.

The relatively fixed member or body 1 which is constructed of a single piece of sheet metal comprises in its construction a front 4$^a$, a back 5, and side connecting portions 6 which form longitudinal grooves 7 for the reception of the slidable clamping member or slide. The body portion is formed by bending the sheet metal at the side connecting portion 6 and the back 5 which is composed of the side portions of the sheet of material is provided at the top with a loop or eye 8 for enabling the hose supporter to be readily attached to a strip of webbing or other suitable material. The lower portion of the front 4$^a$ is cut transversely to form a pair of curved transversely disposed flanges 9 which are adapted to engage and be partially embedded in a jaw 10 constructed of soft rubber or other yieldable material and provided in its outer engaging face with an approximately V-shaped groove or depression 11 into which the fabric of the hose is forced by the relatively movable member 2. The jaw or engaging portion 10 extends beyond the flanges 9 so that only the rubber comes in contact with the hose.

The relatively movable member 2 consists of a metallic backing plate 12 and an approximately triangular block or piece 13 of rubber or other suitable yieldable material which engages the hose 4 and forces the same into the groove or depression of the yieldable block or jaw of the relatively fixed body portion or member. The relatively movable member is connected with the relatively fixed body portion or member by an approximately rectangular swinging frame 14 constructed of wire or other suitable material and composed of transverse portions and connecting side portions, the transverse portions 15 and 16 forming pivots or pintles. The transverse pintle portion 15 is arranged in a bearing formed by a flange 17 located at the bottom of the longitudinal opening 18 in the upper portion of the front of the relatively fixed member. The flange is angularly bent or curved as shown and the open frame 14 is adapted to swing inwardly and outwardly to carry the movable member into and out of engagement with the hose. The transverse pintle portion 16 extends through the relatively fixed member and constitutes a pivot or pintle for the same.

The movable member is maintained in engagement with the fabric of the hose by the resilient slide 3 which consists of a front portion 18 and a back portion 19, and connecting bends 20. The resilient slide is constructed of a single piece of wire and the front consists of an approximately U-shaped loop while the back is composed of a pair of substantially U-shaped loops. The outer sides of the loops of the back slide in the grooves 7 of the relatively fixed member of the safety hose supporter and the front is provided at opposite sides with humps or bends 21 forming convenient means for enabling the slide to be readily grasped in manipulating it to force the slide into and out of engagement with the relatively movable member. The front approximately U-shaped loop of the slide passes over the metallic backing plate of the relatively movable member and the hose is yieldably gripped between the soft rubber faces of the engaging portions of the safety hose supporter. When the resilient slide is moved upwardly out of engagement with the relatively movable member the hinged rectangular frame 14 will permit the relatively movable member to swing outwardly and the pivotal connection between the relatively movable member and the frame enables the relatively movable member to adjust itself in the clamping action of the device. This construction enables the strain on the parts to be equalized and there is no danger of cutting or tearing the fabric of the hose in placing the same in or removing the same from the safety hose supporter.

In case of excessive strain or pull on the hose the device will yield and prevent injury to the fabric.

What is claimed is:—

1. A supporter of the class described including a relatively fixed body portion constructed of sheet metal and composed of a front, back and connecting side portions forming side grooves, said body portion being provided at the upper portion of the front with an opening and having bearing and clamping flanges at the lower portion, a jaw of yieldable material secured to the relatively fixed member by the clamping flanges, a swinging frame hinged to the relatively fixed member by the bearing flange, a relatively movable member carried by the swinging frame and having a yieldable portion or jaw to coact with the jaw of the relatively fixed member and a resilient slide mounted in the said grooves and provided with means for engaging the relatively movable member.

2. A supporter of the class described including a relatively fixed member having a front opening and provided at opposite sides thereof with guiding grooves, a swinging frame hinged to the relatively fixed member at the bottom of the said opening, a movable member carried by the swinging frame, and a resilient slide constructed of a single piece of material and consisting of a front approximately U-shaped loop, substantially U-shaped rear loops slidable in the said grooves and bends connecting the front and rear loops, the said front loop being arranged to extend through the said opening and engage the movable member.

3. A supporter of the class described including a fixed member, a block of yieldable material mounted on and extending across the fixed member and provided in its outer face with an approximately V-shaped groove, a movable member provided with a substantially triangular block of yieldable material arranged to force a fabric into the said V-shaped groove, and means for holding the movable and fixed members in engagement with the fabric to be clamped.

In testimony whereof I affix my signature in presence of two witnesses.

TRUMAN MEAD IRWIN.

Witnesses:
C. McGeyor,
J. Evoy.

Copies of this patent may be obtained for five cents each, by addressing the "Commissioner of Patents, Washington, D. C."